US011886055B2

(12) United States Patent
Mentovich et al.

(10) Patent No.: US 11,886,055 B2
(45) Date of Patent: Jan. 30, 2024

(54) LOW VOLTAGE MODULATOR (71) Applicant: Mellanox Technologies, Ltd., Yokneam (IL)

(72) Inventors: Elad Mentovich, Tel Aviv (IL); Joan Yiqiong Fong, San Marino, CA (US); Wei Qian, Torrance, CA (US); Dazeng Feng, El Monte, CA (US); Roshanak Shafiiha, La Canada Flintridge, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 207 days.

(21) Appl. No.: 17/247,583

(22) Filed: Dec. 17, 2020

(65) Prior Publication Data

US 2021/0191164 A1 Jun. 24, 2021

Related U.S. Application Data (60) Provisional application No. 62/952,313, filed on Dec. 22, 2019.

(51) Int. Cl.
*G02F 1/025* (2006.01)

(52) U.S. Cl.
CPC ........ *G02F 1/025* (2013.01); *G02F 2201/063* (2013.01)

(58) Field of Classification Search
CPC ............................ G02F 1/025; G02F 2201/063
USPC .......................................................... 385/1–3
See application file for complete search history.

(56) References Cited

U.S. PATENT DOCUMENTS

| | | | |
|---|---|---|---|
| 6,345,131 B1 * | 2/2002 | Jang | ........................ G02F 1/011 385/16 |
| 7,409,123 B1 | 8/2008 | Feng | |
| 7,542,641 B1 | 6/2009 | Asghari | |
| 7,658,552 B2 | 2/2010 | Asghari | |
| 7,917,035 B2 | 3/2011 | Asghari | |
| 8,090,231 B1 | 1/2012 | Asghari | |

(Continued)

FOREIGN PATENT DOCUMENTS

WO     2022200292 A1     9/2022

OTHER PUBLICATIONS

Ackermann, M. et al., "Sub-wavelength tunneling barrier in rib waveguide microring modulators with vanishing pending losses," Opt. Lett. 47, 2626-2629 (2022).

(Continued)

*Primary Examiner* — Robert Tavlykaev
(74) *Attorney, Agent, or Firm* — Moore & Van Allen PLLC; Anup Iyer (57) ABSTRACT

A modulator and method of fabrication thereof are provided. In various embodiments, the modulator is a Franz-Keldysh (FK) effect electro-absorption modulator. In an example embodiment, the modulator comprises a waveguide column formed from waveguide material deposited onto a substrate; a first contact layer doped with a P-type dopant and deposited on a first side of the waveguide column; a second contact layer doped with an N-type dopant and deposited on a second side of the waveguide column; and first and second contacts. The first contact is in electrical communication with the first contact layer and the second contact is in electrical communication with the second contact layer.

28 Claims, 6 Drawing Sheets

(56) References Cited

U.S. PATENT DOCUMENTS

| | | | |
|---|---|---|---|
| 8,160,404 B2* | 4/2012 | Pan | H01L 31/1055 385/129 |
| 8,242,432 B2 | 8/2012 | Feng | |
| 8,346,028 B2 | 1/2013 | Feng | |
| 8,411,260 B1 | 4/2013 | Feng | |
| 8,463,088 B1 | 6/2013 | Asghari | |
| 8,476,576 B2 | 7/2013 | Dong | |
| 8,526,769 B1 | 9/2013 | Feng | |
| 8,638,485 B2 | 1/2014 | Feng | |
| 8,724,100 B1 | 5/2014 | Asghari | |
| 8,728,837 B2 | 5/2014 | Fong | |
| 8,737,772 B2 | 5/2014 | Dong | |
| 8,817,354 B2 | 8/2014 | Feng | |
| 8,897,606 B2 | 11/2014 | Asghari | |
| 8,965,208 B2 | 2/2015 | Asghari | |
| 8,989,522 B2 | 3/2015 | Qian | |
| 9,025,241 B2 | 5/2015 | Asghari | |
| 9,142,698 B1* | 9/2015 | Cunningham | H01L 21/26513 |
| 9,217,831 B1 | 12/2015 | Asghari | |
| 9,217,836 B2 | 12/2015 | Asghari | |
| 9,244,327 B2 | 1/2016 | Prosyk | |
| 9,274,353 B1 | 3/2016 | Dong | |
| 9,279,936 B2 | 3/2016 | Qian | |
| 9,312,960 B1 | 4/2016 | Feng | |
| 9,379,515 B1 | 6/2016 | Asghari | |
| 9,588,294 B2 | 3/2017 | Fong | |
| 9,702,278 B2 | 7/2017 | Gruener | |
| 9,798,166 B1* | 10/2017 | Sharma | G02F 1/025 |
| 9,966,733 B2 | 5/2018 | Feng | |
| 9,991,965 B2 | 6/2018 | Christensen | |
| 10,031,355 B2 | 7/2018 | Feng | |
| 10,078,232 B1 | 9/2018 | Vermeulen | |
| 10,288,805 B2 | 5/2019 | Luff | |
| 10,330,864 B2 | 6/2019 | Asghari | |
| 10,394,060 B2 | 8/2019 | Mentovich | |
| 10,649,244 B1 | 5/2020 | Mentovich | |
| 10,895,797 B2 | 1/2021 | Cavaliere | |
| 11,397,363 B2 | 7/2022 | Kawakami | |
| 2010/0330727 A1* | 12/2010 | Hill | G02F 1/025 257/E31.127 |
| 2012/0251029 A1 | 10/2012 | Kobrinsky | |
| 2013/0182305 A1* | 7/2013 | Feng | G02F 1/025 438/31 |
| 2015/0010263 A1* | 1/2015 | Fong | G02F 1/025 438/57 |
| 2015/0055911 A1* | 2/2015 | Bowers | G02F 1/01708 385/2 |
| 2017/0269391 A1* | 9/2017 | Feng | G02F 1/0147 |
| 2017/0351124 A1* | 12/2017 | Roth | G02B 6/12002 |
| 2018/0314128 A1 | 11/2018 | Sun | |
| 2019/0179177 A1* | 6/2019 | Rickman | H04B 10/299 |
| 2019/0293971 A1* | 9/2019 | Yu | G02F 1/017 |
| 2020/0012043 A1* | 1/2020 | Abediasl | H01L 31/02327 |
| 2020/0124878 A1* | 4/2020 | Yu | H01L 27/30 |
| 2021/0336418 A1 | 10/2021 | Iakovlev | |
| 2022/0236619 A1 | 7/2022 | Hoessbacher | |
| 2022/0337321 A1 | 10/2022 | Argyris | |
| 2023/0018578 A1 | 1/2023 | Bakopoulos | |

OTHER PUBLICATIONS

Akiyama, S. et al. "Cascaded-ring-resonator-loaded Mach-Zehnder modulator for enhanced modulation efficiency in wide optical bandwith," Opt. Expr. 20, 16321-16338 (2012).

Akiyama, Suguru et al. "InP-Based Mach-Zehnder Modulator With Capacitively Loaded Travelling-Wave Electrodes," Journal of Lightwave Technology, vol. 26, No. 5, Mar. 1, 2008, pp. 608-615, DOI: 10.1109/JLT.2007.915278.

Bin Wang et al. (2022), "Principles of Selective Area Epitaxy and Applications in III-V Semiconductor Lasers Using MOCVD: A Review," Crystals 2022, 12(7), 1011.

Chacinski, Marck et al. "Monolithically Integrated 100 GHz DFB-TWEAM," Journal of Lightwave Technology, vol. 27, No. 16, Aug. 15, 2009, pp. 3410-3415, DOI: 10.1109/JLT.2009.2015773. Available online: URL: https://opg.optica.org/jlt/abstract.cfmuri=jlt-27-16-3410.

Cui, Yansong et al. "Modeling and Design of GaAs Traveling-Wave electrooptic Modulators Based on Capacitively Loaded Coplanar Strips," Journal of Lightwave Technology, vol. 24, No. 1, Jan. 2006, pp. 544-554, DOI: 10.1109/JLT.2005.859851.

D. A. B. Miller et al. (1984), "Band-Edge Electroabsorption in Quantum Well Structures: The Quantum-Confined Stark Effect," Phys. Rev. Lett. 53, 2173.

Han, C. et al., "Recent progress in silicon-based slow-light electro-optic modulators," Micromachines 13, 400 (2022).

Han, C. et al., "Ultra-compact silicon modulator with 110 GHz bandwith," in Proc. Opt. Fib. Comm. Conf. (OFC), (Optica Publishing Group, Washington, D.C. 2022), p. Th4C.5.

Horikawa, T. et al., "A 300-nm silicon photonics platform for large-scale device integration," J. Sel. Top. Quant. Electron, 24, 8200415 (2018).

Hou et al. (2010), "Monolithic 40 GHz passively Mode-locked AlGaInAs/InP 1.55 mm MQW Laser with Surface-etched Bragg Gratings," European Conference on Integrated Optics (ECIO 10).

J. Yan, T. Yeh, Y. Chang, Y. Wu, and K. Feng, "DSP Equalization-free Data Center Communication with High Dispersion Tolerant Optical Duobinary-PAM4 Signal," in Conference on Lasers and Electro-Optics, OSA Technical Digest (online) (Optical Society of America, 2017), paper SF1L.4.

Jafari, O. et al., "Mach-Zehnder silicon photonic modulator assisted by phase-shifted bragg gratings," Photon. Technol. Lett. 32, 445-448 (2020).

K. Yonenaga and S. Kuwano, "Dispersion-Tolerant Optical Transmission System Using Duobinary Transmitter and Binary Receiver," IEEE J. Lightwave Technol., vol. 15, No. 8, pp. 1530-1537, 1997.

Klein, H.N. et al. "1.55µm Mach-Zehnder Modulators on InP for Optical 40/80 Gbit/s Transmission Networks," In 2006 International Conference on Indium Phosphide and Related Materials Conference Proceedings, May 8, 2006, pp. 171-173, IEEE.

Lange, Sophie et al. "100 GBd Intensity Modulation and Direct Detection With an InP-Based Monolithic DFB Laser Mach-Zehnder Modulator," Journal of Lightwave Technology, vol. 36, No. 1, Jan. 1, 2018, pp. 97-102.

Lange, Sophie et al. "Low Switching Voltage Mach-Zehnder Modulator Monolithically Integrated With DFB Laser for Data Transmission up to 107.4 Gb/s," Journal of Lightwave Technology, vol. 34, No. 2, Jan. 15, 2016, pp. 401-406, DOI: 10.1109/JLT.2015.2496426.

Li, G.L. et al. "Analysis of Segmented Traveling-Wave Optical Modulators," Journal of Lightwave Technology, vol. 22, No. 7, Jul. 2004, pp. 1789-1796, DOI: 10.1109/JLT.2004.831179. Available online: URL: https://opg.optica.org/jlt/abstract.cfmuri=jlt-22-7-1789.

Li, G.L. et al. "Numerical Modeling of Segmented Traveling-Wave Electroabsorption Modulators," In 2004 IEE MTIT-S International Microwave Symposium Digest (IEEE Cat. No. 04CH37535), Jun. 6, 2004, vol. 2, pp. 773-776, IEEE.

Margalit, N. et al., "Perspectives on the future of silicon photonics and electronics," Appl. Phys. Lett. 118, 220501 (2021).

Nakai, Y. et al. (2019), "Uncooled Operation of 53-GBd PAM4 (106-Gb/s) EA/DFB Lasers With Extremely Low Drive Voltage With 0.9 Vpp," Journal of Lightwave Technology, vol. 37, Issue 7, pp. 1658-1662.

Nan Qi et al., Co-Design and Demonstration of a 25 Gbps Silicon-Photonic Mach Zehnder Modulator with a CMOS Based High Swing Driver, IEEE, Nov. 2016, pp. 1-11 (Year: 2016).

Ogiso, Yoshihiro et al. "Over 67 GHz Bandwidth and 1.5 V Vp InP-Based Optical IQ Modulator With n-i-p-n Heterostructure," Journal of Lightwave Technology, vol. 35, No. 8, Apr. 15, 2017, pp. 1450-1455, DOI: 10.1109/JLT.2016.2639542.

Qian, Guang et al. "CL-TWE Mach-Zehnder Electro-Optic Modulator Based on InP-MQW Optical Waveguides," Chinese Optics Letters, vol. 17, No. 6, Jun. 2019, pp. 061301-1-061301-5, DOI: 10.3788/COL201917.061301.

(56) References Cited

OTHER PUBLICATIONS

Romero-Garcia, Sebastian et al., "High-speed resonantly enhanced silicon photonics modulator with a large operating temperature range", Optic Letters, vol. 42, Issue 1, pp. 81-84 (2017). https://doi.org/10.1364/OL.42.000081.

Sharif Azadeh, S. et al., "Low Vp silicon photonics modulators with highly linear epitaxially grown phase shifters," Opt. Expr. 23, 23526-23550 (2015).

Stepanenko, M. et al. "Optimization of RF Electrodes for Electro-Optic Modulator Based on Quantum-Confined Stark Effect," In Journal of Physics: Conference Series 2019, vol. 1145, No. 1:012028, pp. 1-6, IOP Publishing.

Stepanenko, Mikhail et al. "Multi-Parameter Optimization of an InP Electro-Optic Modulator," Symmetry, vol. 12, Nov. 21, 2020, pp. 1-18, DOI: 10.3390/sym12111920.

Tamura, M. et al. (2003), "High-speed electroabsorption modulators using ruthenium-doped Si—InP: impact of interdiffusion-free burying technology on E/O modulation characteristics," International Conference on Indium Phosphide and Related Materials, 2003. pp. 491-494.

Terada, Y. et al., "Full C-band Si photonic crystal waveguide modulator," Opt. Lett. 42, 5110-5112 (2017).

U.S. Appl. No. 17/644,625, filed Dec. 16, 2021, entitled "High Bandwidth Optical Modulator".

U.S. Appl. No. 17/694,159, filed Mar. 14, 2022, entitled "Serial Data Conversion Redundacy Using Optical Modulators".

U.S. Appl. No. 17/810,068, filed Jun. 30, 2022, entitled "High Bandwidth Travelling Wave Electro Absorption Modulator (EAM) Chip".

U.S. Appl. No. 17/993,296, filed Nov. 23, 2022, entitled "Traveling Wave Cascaded Micro Ring Modulators".

U.S. Appl. No. 18/110,206, filed Feb. 15, 2023, entitled "System for In-Band Spectral Cross-Talk Monitoring".

U.S. Appl. No. 18/120,719, filed Mar. 13, 2023, entitled "Differential Traveling Wave Electro-Absorption Modulator for High Bandwidth Operation".

U.S. Appl. No. 18/120,802, filed Mar. 13, 2023, entitled "Low Voltage Traveling Wave Electro-Absorption Modulator for High Bandwidth Operation".

U.S. Appl. No. 63/266,527, filed Jan. 7, 2022, entitled "High Bandwidth Travelling Wave Electro Absorption Modulator (EAM) Chip".

Velthaus, K.-O. et al. "High Performance InP-Based Mach-Zehnder Modulators for 10 to 100 Gb/s Optical Fiber Transmission Systems," 23rd International Conference on Indium Phosphide and Related Materials—IPRM 2011, May 22-26, 2011, (4 pages), Berlin, Germany.

Wang, Gary et al. "Low Vp, High Bandwidth, Small Form Factor InP Modulator," in 2014 IEEE Avionics, Fiber-Optics and Photonics Technology Conference (AVFOP), Nov. 11, 2014, pp. 41-42, IEEE.

Witzens, J., "High-Speed silicon photonics modulators," Proc. IEEE 106, 2158-2182 (2017).

Yamazaki, Hiroshi et al. "IMDD Transmission at Net Data Rate of 333 Gb/s Using Over-100-GHz-Bandwidth Analog Multiplexer and Mach-Zehnder Modulator," Journal of Lightwave Technology, vol. 37, No. 8, Apr. 15, 2019, pp. 1772-1778, DOI: 10.1109/JLT.2019.2898675.

\* cited by examiner

LOW VOLTAGE MODULATOR

CROSS-REFERENCE TO RELATED APPLICATIONS

This application claims priority to U.S. Application No. 62/952,313, filed Dec. 22, 2019, the content of which is incorporated herein by reference in its entirety.

BACKGROUND

As data communication demands increase in both volume and speed, optical communications have become an increasingly popular communication approach. For optical communications within a data center, for example, a short reach transceiver may be used to transmit and/or receive communications between computing elements.

BRIEF SUMMARY

Various embodiments provide a low power modulator that may be used by a short reach transceiver, for example, to generate a wavelength division multiplexing signal. For example, the modulator may be a Franz-Keldysh (FK) effect modulator. For example, the modulator may be an electro-absorption modulator that uses the FK effect to control or modulate the intensity of a laser beam, such as via application of an electric voltage. In various embodiments, the modulator comprises a waveguide configured to guide an optical carrier. In various embodiments, the waveguide comprises a waveguide material having a first contact layer deposited on one side of the waveguide material and a second contact layer deposited on the opposite side of the waveguide material. The first contact layer is doped with a P-type dopant and the first contact layer is doped with an N-type dopant. For example, the first and second contact layers may be doped polycrystalline silicon (poly-si), doped polycrystalline germanium (poly-ge), and/or other appropriately doped amorphous composition. In various embodiments, the waveguide material comprises GeSi. In various embodiments, a waveguide column is formed from the waveguide material such that the waveguide column is less than one micron in width.

According to a first aspect of the present disclosure, a modulator is provided. In an example embodiment, the modulator is an FK effect electro-absorption modulator. In an example embodiment, the modulator comprises a waveguide comprising a waveguide column comprising a waveguide material, the waveguide column having a first side and an opposite second side, the first and second sides extending out from a substrate; a first contact layer disposed on a first side of the waveguide that is doped with a P-type dopant; and a second contact layer disposed on a second side of the waveguide that is doped with an N-type dopant. In an example embodiment, the first contact layer and the second contact layer comprise at least one of at least one of polycrystalline silicon, polycrystalline germanium, or an amorphous composition.

According to another aspect of the present disclosure, a modulator is provided. In an example embodiment, the modulator comprises a substrate; waveguide material deposited onto the substrate and formed into a waveguide column; a first contact layer doped with a P-type dopant and deposited on a first side of the waveguide column; a second contact layer doped with an N-type dopant and deposited on a second side of the waveguide column; and first and second contacts, the first contact being in electrical communication with the first contact layer and the second contact being in electrical communication with the second contact layer.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "top," "about," "around," etc. are used for explanatory purposes in the examples provided below to describe the relative position of certain components or portions of components. As used herein, the terms "substantially" and "approximately" refer to tolerances within manufacturing and/or engineering standards.

Various embodiments relate to and/or provide an FK modulator comprising a waveguide. In various embodiments, the waveguide acts as a PIN junction. In general, a PIN junction comprises a P-region within which holes are the majority charge carrier, an intrinsic region within which there are not free charge carriers, and an N-region within which electrons are the majority charge carrier. The intrinsic region (e.g., a region with doping concentrations less than $1 \times 10^{14}$-$1 \times 10^{16}$ per cubic centimeter) acts as an insulator between the P-region and the N-region. For example, the intrinsic region may have a high resistance which obstructs the flow of electrons and/or holes therethrough such that the PIN junction acts as a capacitor.

Figure 5:
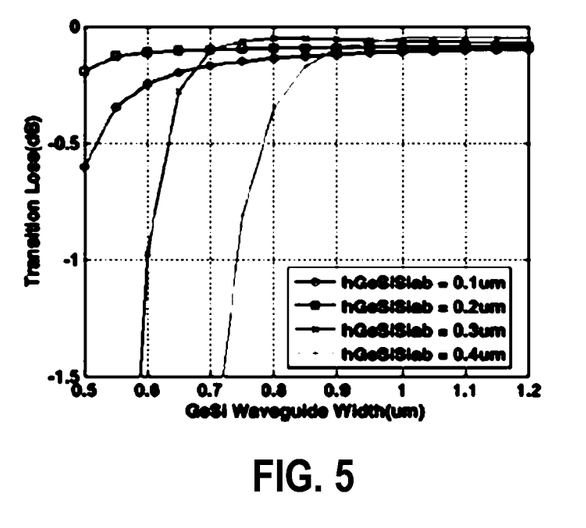
FIG. 5 provides a plot showing the transmission loss as a function of waveguide width for four different waveguide column heights, according to an example embodiment.

As described in more detail with regard to FIG. 5, the width of the waveguide (e.g., the distance between the contact layers along the sides of the waveguides in a plane substantially perpendicular to the transmission axis of the waveguide) can significantly affect the transition loss of the waveguide. Conventional waveguides are approximately one micron in width. However, in order to accommodate the evolving bandwidth and power requirements of such waveguides, various embodiments provide waveguides having a width of less than one micron (e.g., a width in the range of 0.3 to 0.9 microns or 0.3 to 0.8 microns). When the width of the waveguide is reduced below one micron, the P-region and N-region of the PIN junction start to overlap. In other words, the intrinsic region which enables the PIN junction to act as a capacitor becomes too narrow to be functional and/or non-existent. Thus, a technical problem exists as to how to provide a wavelength with a width of less than a micron (e.g., in the range of 0.3 to 0.8 microns, for example) that is still a PIN junction that can function as a capacitor. Various embodiments of the present disclosure provide a technical solution to this technical problem, as will now be described in detail.

Example Waveguide

Figure 1:
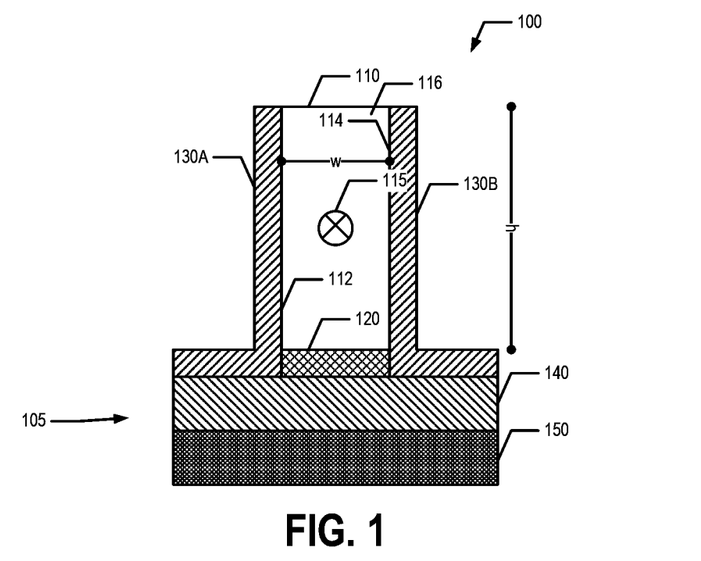
FIG. 1 illustrates a cross-section of a waveguide, in accordance with an example embodiment.

FIG. 1 illustrates a waveguide 100 that may be part of an example embodiment of a low power modulator. In various embodiments, the waveguide 100 is part of an FK effect modulator. For example, the waveguide 100 may be part of an FK effect electro-absorption modulator. In an example embodiment, the modulator is configured for performing multiplexing and demultiplexing in accordance with wavelength division multiplexing (WDM), such as coarse WDM (CWDM). In an example embodiment, the waveguide 100 is configured for propagating and/or transmitting light in the wavelength range of 1260-1670 nm. Thus, the waveguide 100 may be used for transmission and/or modulation of a broad range of wavelengths. For example, the waveguide 100 may be configured to propagate and/or transmit light having a characteristic wavelength of 1310 nm and/or 1550 nm. Various embodiments of the waveguide 100 may be compatible with various other wavelengths. For example, the waveguide material 116 may be selected based the desired wavelength and/or wavelength range for transmission and/or modulation. For example, the width w of the of the waveguide column 110 may be selected based on the desired wavelength and/or wavelength range for transmission and/or modulation.

In various embodiments, the waveguide 100 comprises waveguide material 116 formed into a waveguide column 110 configured to guide an electromagnetic wave, beam, pulse, and/or the like along the waveguide 100 in a direction substantially parallel to a transmission axis 115 of the waveguide 100. As illustrated, the waveguide column 110 has a cross-section that is generally rectangular in a plane that is substantially perpendicular to the transmission axis 115 of the waveguide 100. However, in various embodiments, the waveguide column 110 may have various different cross-sections, as appropriate for the application. For example, the cross-section of the waveguide 100 shown in FIG. 1 is taken in a plane substantially perpendicular to the transmission axis 115 of the waveguide 100. In an example embodiment, the waveguide 100 extends 20-100 microns in a direction that is substantially parallel to the transmission axis 115.

In various embodiments, the waveguide 100 extends out from a substrate 105. In the illustrated example embodiment, the substrate 105 comprises a silicon substrate 150 with a buried oxide layer 140 formed within the silicon substrate 150. A second layer of silicon 120 may be disposed between the buried oxide layer 140 and the waveguide material 116. In an example embodiment, the second layer of silicon 120 is in the range of 0.1-0.4 microns thick.

In various embodiments, the waveguide column 110 extends outward from the substrate 105. For example, the waveguide material 116 may be deposited onto the substrate and then etched to form a waveguide column 110. For example, the waveguide column 110 may be formed to have a substrate adjacent edge that abuts a surface of the substrate 105 (e.g., the layer of silicon 120). The waveguide column 110 may be further formed to have a first side 112 that extends out from the substrate 105 and a second side 114 that extends out from the substrate 105. In the depicted embodiment, the transmission axis 115 of the waveguide 100 is disposed between the first side 112 and the second side 114 of the waveguide column 110 such that the waveguide 100 is configured to transmit electromagnetic waves, beams, pulses, and/or the like along the waveguide 100 between the first side 112 and the second side 114.

In various embodiments, the width w of the waveguide column 110 (e.g., between the first side 112 and the second side 114) in a plane that that is substantially perpendicular to the transmission axis 115 (and along a line substantially parallel to the surface of the substrate 105 within the plane that is substantially perpendicular to the transmission axis 115) is less than one micron. For example, the width w of the waveguide column 110 may be in the range of 0.4 microns to 0.9 microns, in various embodiments. In various embodiments, the width w of the waveguide column 110 may be in the range of 0.2 or 0.4 to 0.8 microns. In an example embodiment, the width w of the waveguide column 110 is approximately 0.6 microns. In an example embodiment, the waveguide material 116 comprises GeSi. In various embodiments, the waveguide column 110 has a height h in the range of 0.1 microns to 1 micron. In various embodiments, the waveguide column 110 has a height h in the range of 0.2 to 0.5 microns. For example, in an example embodiment, the height h of the waveguide column 110 is approximately 0.25-0.4 microns.

Conventional waveguides comprising GeSi are doped such that a left side of the waveguide is doped with a first dopant and a right side of the waveguide is doped with a second dopant. However, when the width w of the waveguide material is reduced to less than one micron, a first dopant profile of the first dopant and a second dopant profile of the second dopant overlap in a central region of the waveguide such that the waveguide does not include an intrinsic region and is not a PIN junction. For example, when the first dopant profile of the first dopant and a second dopant profile of the second dopant overlap in a central region of the waveguide, the waveguide material fails to act as a capacitor anymore and does not provide an appropriate or functional waveguide for an FK effect modulator. In order to increase the bandwidth of such conventional waveguides in accordance with increases in bandwidth requirements for optical communications, the width w of the waveguide material may be decreased to reduce the absorption of an electromagnetic wave, beam, pulse, and/or the like being transmitted along the waveguide. This results in a technical problem as reduction of the width of the waveguide results in the waveguide not being a functional waveguide. Various embodiments provide a technical solution to this technical problem, as will now be described in more detail.

As shown in FIG. 1, the waveguide 100 comprises a first contact layer 130A disposed and/or deposited on the first side 112 of the waveguide column 110 and a second contact layer 130B disposed and/or deposited on the second side 114 of the waveguide column 110. In various embodiments, the first contact layer 130A comprises poly-si, poly-ge, an amorphous composition, and/or the like that is doped with a P-type dopant and the second contact layer 130B comprises poly-si, poly-ge, an amorphous composition, and/or the like that is doped with an N-type dopant. As should be understood by one skilled in the art, in an example embodiment, the first contact layer 130A may comprise poly-si, poly-ge, an amorphous composition, and/or the like that is doped with an N-type dopant and the second contact layer 130B may comprise poly-si, poly-ge, an amorphous composition, and/or the like that is doped with a P-type dopant. In an example embodiment, the P-type dopant is boron and the N-type dopant is phosphorus, but other dopants may be used in other embodiments, as appropriate for the application. In various embodiments, the contact layers 130A, 130B have widths that are in the range of 0.1-0.3 microns. In various embodiments, the concentration profile of various dopants across the waveguide 100 (e.g., first contact layer 130A, the waveguide column 110, and the second contact layer 130B) may be configured such that the extinction ratio enables the modulator 200 to operate at a high bandwidth.

In various embodiments, the first and second contact layers 130A, 130B are heavily doped with the corresponding dopant. For example, the first contact layer may be doped with at least $1\times10^{16}$ per cubic centimeter of the P-type dopant and the second contact layer may be doped with at least $1\times10^{16}$ per cubic centimeter of the N-type dopant.

Figure 3A:
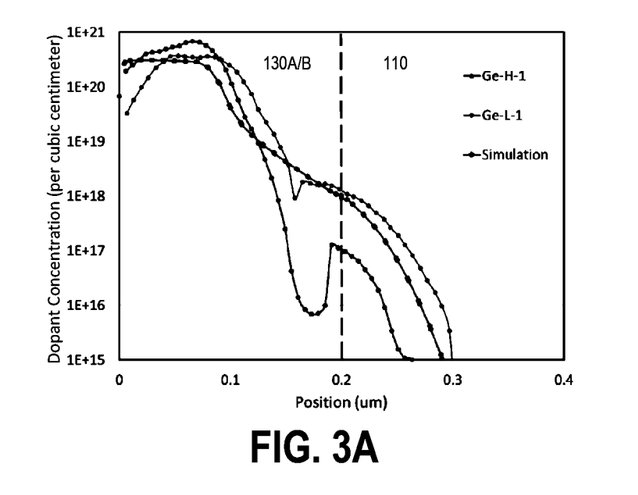
FIGS. 3A and 3B provide plots showing example experimental and simulation results of dopant concentrations in a doped contact layer and adjacent waveguide material, in accordance with an example embodiment.
Figure 3B:
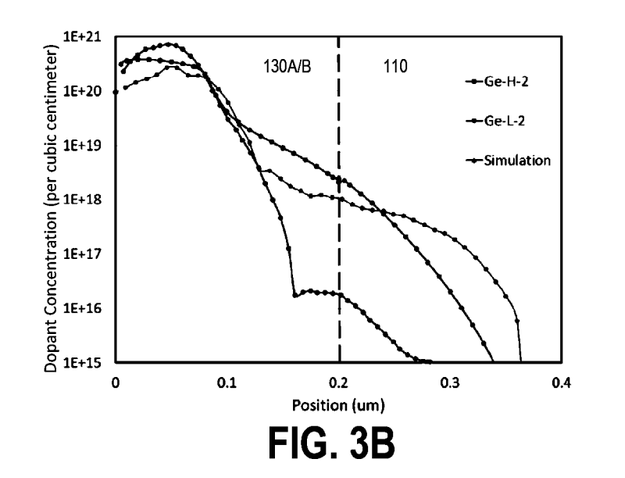

In various embodiments, the first and second contact layers 130A, 130B are doped after they have been deposited onto the first and second sides 112, 114, respectively, of the waveguide column 110. Thus, in various embodiments, as the dopants are being diffused and/or implanted into the first and second contact layers 130A, 130B, some of the dopant may be diffused and/or implanted into the 0.1-0.2 microns of the waveguide column 110 that is adjacent the respective one of the first and second sides 112, 114. For example, the approximately 0.1 microns of the waveguide column 110 closest to the first side 112 may have a concentration of $1\times10^{15}$ to $1\times10^{19}$ per cubic centimeter of the dopant diffused and/or implanted into the first contact layer 130A. Similarly, the approximately 0.1 microns of the waveguide column 110 closest to the second side 114 may have a concentration of $1\times10^{15}$ to $1\times10^{19}$ per cubic centimeter of the dopant diffused and/or implanted into the second contact layer 130B. However, by 0.2 microns into the waveguide column 110 from each of the first and second sides, the concentration of a respective dopant present is low enough to maintain the conductance of the waveguide column 110 at a low enough value that the waveguide column 110 acts as a capacitor rather than a conductor when voltage is applied to the first and second contact layers 130A, 130B. For example, in various embodiments, the width w of the waveguide column 110 may be 0.8 microns or less and the waveguide 100 may be a functional PIN junction. For example, FIGS. 3A and 3B show plots of dopant concentrations of a contact layer 130A, 130B and an adjacent portion of waveguide column 110.

Example Modulator

Figure 2:
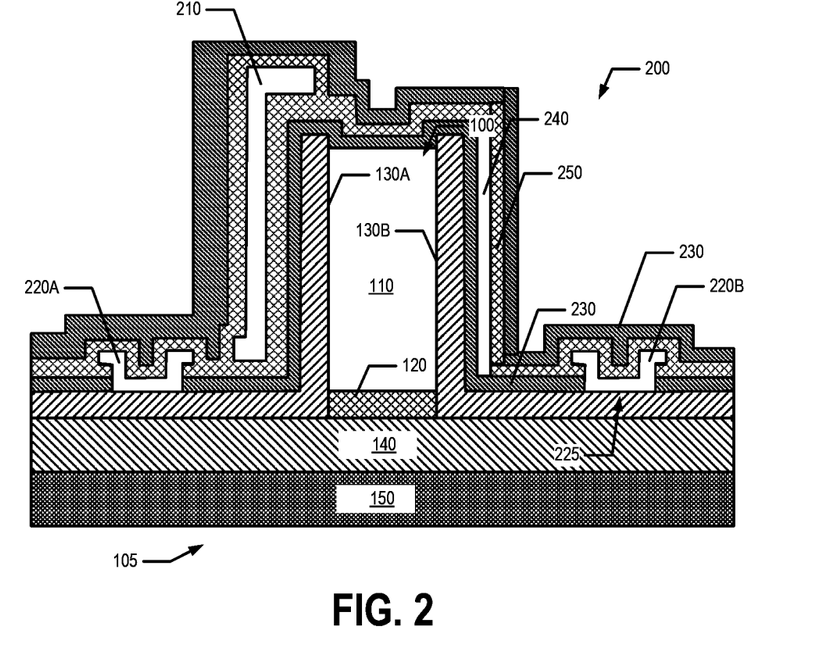
FIG. 2 illustrates a cross-section of a portion of a modulator comprising the waveguide, in accordance with an example embodiment.

FIG. 2 illustrates a cross-section of a portion of an example modulator 200 comprising a waveguide 100. For example, the modulator 200 may be an FK effect modulator, such as an FK effect electro-absorption modulator. In an example embodiment, the modulator 200 is configured for performing multiplexing and demultiplexing in accordance with wavelength division multiplexing (WDM), such as coarse WDM (CWDM) in the wavelength range of 1260-1670 nm. For example, the modulator 200 may be integrated with a laser diode, possibly on the same chip and/or substrate, to form a data transmitter and/or transistor in the form of a photonic integrated circuit.

The modulator 200 comprises a substrate 105. For example, the substrate 105 may be a silicon substrate 150 with a buried oxide layer 140 formed within the silicon substrate 150. A second layer of silicon 120 may be disposed between the buried oxide layer 140 and the waveguide column 110. The waveguide column 110 extends outward from the substrate 150. The first contact layer 130A is disposed and/or deposited on the first side 112 of the waveguide column 110 and the second contact layer 130B is disposed and/or deposited on the second side 114 of the waveguide column 110. In various embodiments, the first contact layer 130A comprises poly-si, poly-ge, an amorphous composition, and/or the like doped with a P-type dopant and the second contact layer 130B comprises poly-si, poly-ge, an amorphous composition, and/or the like doped with an N-type dopant.

An insulating layer 230 is deposited onto the waveguide 100. For example, the insulating layer 230 may comprise silicon nitride (SiN). Contact openings 225 are etched into the insulating layer 230 and contacts 220A, 220B may be deposited into the contact openings 225. A first contact 220A may be deposited into one of the contact openings 225 such that the first contact is in electrical communication with the first contact layer 130A and the second contact 220B may be deposited into one of the contact openings 225 such that the second contact is in electrical communication with the second contact layer 130B.

A heater 240 may be deposited on the insulating layer 230 (e.g., adjacent the second side 114 and/or second contact layer 130B). In an example embodiment, depositing the heater 240 may comprise sputtering and/or lithographical processes. In various embodiments, the heater 240 comprises titanium nitride (TiN), tungsten (W), tantalum (Ta), tantalum nitride (TaN), and/or the like. In various embodiments, the heater 240 may be configured in electrical communication with a voltage and/or current source. For example, the heater 240 may be configured to receive a voltage and/or current signal and generate heat (e.g., via resistive means) based thereon. For example, the heater 240 may be used to increase the temperature of one or more components of the modulator 200 and/or waveguide 100 to a desired operating temperature.

In various embodiments, an oxide layer 250 may be deposited onto the insulating layer 230 and heater 240. For example, the oxide layer 250 may comprise thermal oxide, chemical vapor deposit oxide, tetraethyl orthosilicate (TEOS), and/or the like. In an example embodiment, a radiator 210 may be embedded within the oxide layer 250. In an example embodiment, the radiator 210 may be formed via sputtering and/or metal lithography processes. In an example embodiment, the radiator 210 comprises aluminum (Al), titanium (Ti), and/or the like. In an example embodiment, the radiator 210 comprises an aluminum alloy, such as AlSiCu. In various embodiments, the radiator 210 may act as a heat sink and/or dissipative element to receive and/or dissipate excess heat generated through operation of the modulator 200 and/or waveguide 100. In an example embodiment, the modulator 200 further comprises a second insulating layer 230 deposited on the oxide layer 250.

As illustrated in FIG. 5, due to the small width of the waveguide column 110 (e.g., in the range of 0.4 to 0.9 microns in various embodiments; less than 0.8 microns, in various embodiments; and/or approximately 0.6 microns, in an example embodiment), the transmission loss of the waveguide 100 (and thus the modulator 200) is significantly smaller than conventional FK effect modulators (e.g., having waveguide widths of about 1 micron). Thus, the modulator 200 can be operated using lower voltages and/or lower power consumption than conventional FK effect modulators. Moreover, the smaller width of the waveguide column 110

(e.g., in the range of 0.4 to 0.9 microns in various embodiments; less than 0.8 microns, in various embodiments; and/or approximately 0.6 microns, in an example embodiment) enables the waveguide 100 to provide higher bandwidth transmission compared to conventional FK effect modulator waveguides. Additionally, as the FK effect modulator extinction ratio is proportional to the applied voltage divided by the waveguide width, the waveguide 100 provides a larger extinction ratio than conventional FK effect modulator waveguides. Therefore, various embodiments of the modulator 200 comprising a waveguide 100 comprising a thin waveguide column 110 (e.g., with width w in the range of 0.4 to 0.9 microns in various embodiments; less than 0.8 microns, in various embodiments; and/or approximately 0.6 microns, in an example embodiment) and doped contact layers 130A, B provide an improvement over conventional FK effect modulators.

Example Method of Fabrication

Figure 4:
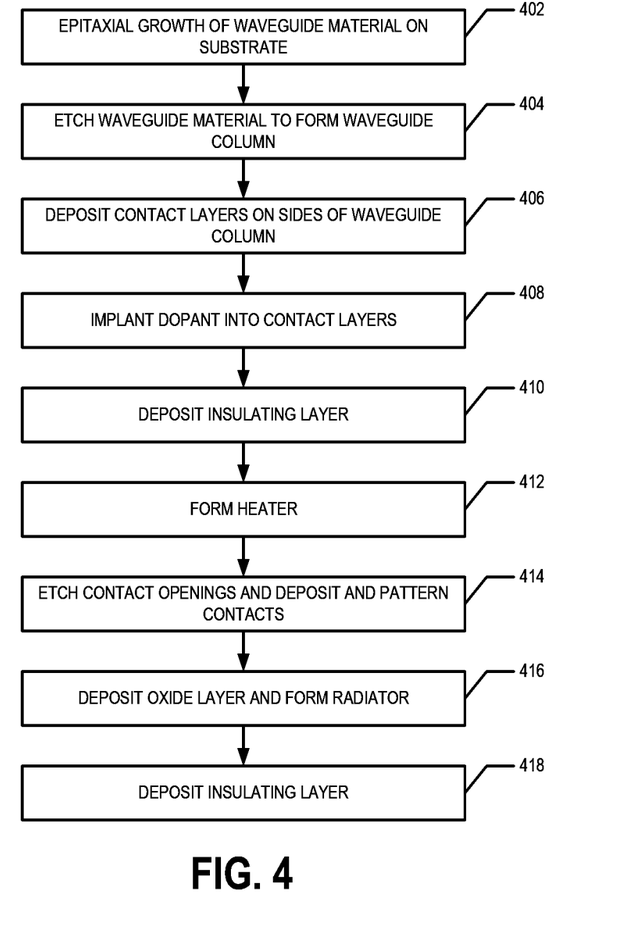
FIG. 4 provides a flowchart illustrating processes, procedures, and operations performed to fabricate the waveguide of a modulator, in accordance with an example embodiment.

FIG. 4 provides a flowchart illustrating processes, procedures, operations, and/or the like for fabricating the waveguide 100 of a modulator 200. Starting at step/operation 402, waveguide material 116 is deposited onto a substrate 105. For example, the substrate 105 may be a silicon substrate 150 having a buried oxide layer 140 formed therein and a second silicon layer 120 between the buried oxide layer 140 and the deposited waveguide material 116. In an example embodiment, the waveguide material 116 comprises undoped GeSi.

At step/operation 404, the waveguide material 116 is etched to form a waveguide column 110. For example, the waveguide material 116 may be etched using a mask, resist layer, and/or the like to form a waveguide column having a width w that is less than one micron. In an example embodiment, the waveguide material 116 is etched to form a waveguide column 110 using a lithography etching technique. In an example embodiment, etching the waveguide material 116 includes etching the second layer of silicon 120 adjacent the waveguide column 110 such that the surface of the buried oxide layer 140 is exposed adjacent the waveguide column 110, as shown in FIG. 1.

FIG. 5 illustrates the transmission loss of a waveguide 100 as a function of the width w of the waveguide column for four example waveguide column 110 heights (indicated as hGeSiSlab in FIG. 5) for an example embodiment having GeSi as the waveguide material. As shown in FIG. 5, for waveguide columns 110 having heights greater than 0.2 microns (e.g., in the 0.2-0.5 micron range) there is a steep increase in transmission loss as a function of the width w of the waveguide column 110 for widths w in the range of 0.5 to 0.8 microns. For example, for a waveguide column 110 having a height h of 0.3 microns, the transmission loss increases steeply as the width w of the waveguide column 110 increases to 0.6 microns. Thus, as illustrated in FIG. 5, forming a waveguide column 110 with a sufficiently small width w is enables a low enough transmission loss for the waveguide 100 for the modulator 200 to be operable at high bandwidth. However, as described above, such reduction of the width w of the waveguide column 110 does not allow for the conventional doping of the waveguide column 110 itself, as the N-type and P-type dopant concentrations overlap in a central portion of the waveguide column 110 causing the conductance of the waveguide 100 to be too high such that the modulator 200 does not function as an FK effect modulator. Various embodiments of the present invention provide solutions to these technical problems.

Returning to FIG. 4, at step/operation 406, the first and second contact layers 130A, 130B may be deposited on to the first and second sides 112, 114, respectively, of the waveguide column 110. In an example embodiment, the contact layer material is deposited onto the waveguide column 110 and the exposed buried oxide layer 140 adjacent the waveguide column 110 using low pressure chemical vapor deposition. For example, contact layer material may be deposited on exposed surfaces of the waveguide column 110, substrate 105, and/or the like. The contact layer material may then be etched (e.g., using a lithography etching technique) to form the first and second contact layers 130A, 130B. Any resist layer or mask used in the etching process may then be removed. In an example embodiment, the contact layer material comprises poly-si, poly-ge, an amorphous composition, and/or the like. In various embodiments, the first and second contact layers 130A, 130B are in contact with the buried oxide layer 140 and the respective sides of the waveguide column 110. For example, the first contact layer 130A may extend out from the substrate 105 along the first side 112 of the waveguide column 110 and may extend along the substrate 105 away from the waveguide column 110 within a waveguide cavity of the modulator 200. For example, the portion of the modulator 200 shown in FIG. 2 may be the portion of the modulator 200 within the waveguide cavity. For example, the waveguide cavity may be bordered by other portions of the modulator 200, such as an echelle grating disposed between the waveguide 100 and a laser cavity and/or laser diode facet. In another example, the waveguide cavity may be bordered by a mesa having a drive pad of the modulator 200 disposed thereon, and/or the like. Similarly, the second contact layer 130B may extend out from the substrate 105 along the second side 114 of the waveguide column 110 and may extend along the substrate 105 away from the waveguide column 110 within a waveguide cavity of the modulator 200.

At step/operation 408, dopant is implanted and/or diffused into the contact layers. For example, a P-type dopant may be implanted and/or diffused into the first contact layer 130A and an N-type dopant may be implanted and/or diffused into the second contact layer 130B, or vice-versa. For example, as shown in FIGS. 3A and 3B, the appropriate dopant may be implanted and/or diffused into the first and second contact layers such that the concentration of the dopant within the corresponding contact layer is in the range of approximately $1 \times 10^{16}$ to $1 \times 10^{21}$ per cubic centimeter. The dopant may also diffuse into a portion of the waveguide material 116 disposed adjacent the corresponding contact layer. In an example embodiment, the concentration of dopant present in the waveguide material 116 falls below $1 \times 10^{15}$ per cubic centimeter within approximately 2 microns of the corresponding side of the waveguide column 110. Thus, a central portion of the waveguide column 110 comprises substantially undoped waveguide material 116.

Figure 6:
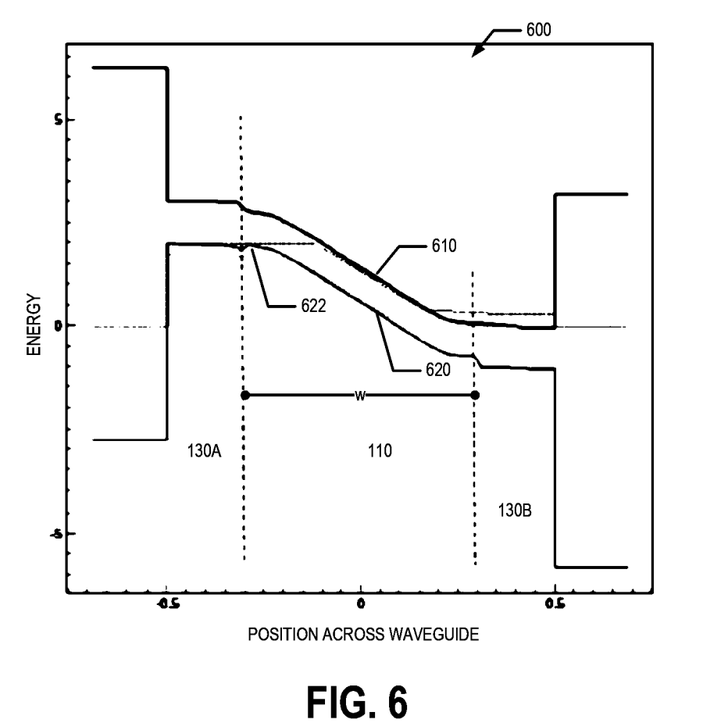
FIG. 6 provides simulation results of the electronic band structure across a waveguide in an example embodiment.

FIG. 6 provides a band diagram 600 showing the electronic band structure across a cross section of the waveguide 100 taken in a plane substantially perpendicular to the transmission axis 105 of the waveguide 115. Both the conduction band 610 and the valence band 620 reduce in energy across the waveguide column 110 from the first contact layer 130A to the second contact layer 130B. The small barrier 622 to the valence band at the interface between the first contact layer 130A and the waveguide column 110 enables low to moderate energy holes (e.g., 50 meV holes) to tunnel through the barrier 622. As should be understood by a person of skill in the art, the electronic band structure shown in FIG. 6 is a result of the doping of the first contact layer 130A and the second contact layer 130B.

Continuing with FIG. 4, at step/operation 410, an insulating layer 230 is deposited. For example, an insulating layer 230 may be deposited onto the waveguide column 110, first and second contact layers 130A, 130B, and/or the like, as shown in FIG. 2. In an example embodiment, the insulating layer 230 comprises SiN. In an example embodiment, the insulating layer 230 is deposited to a thickness in the range of 200-350 nanometers.

At step/operation 412, the heater 240 is formed. For example, heater material may be sputtered and/or deposited onto the exposed surfaces of the waveguide column 110, first and second contact layers 130A, 130B, substrate 105, and/or the like. The heater material may then be etched (e.g., using a dry etch) to form the heater 240. In an example embodiment, the heater material comprises TiN, W, Ta, TaN, and/or the like. In various embodiments, a via may be formed and/or opened for use in placing the heater 240 into electrical communication with a voltage/current source during operation of the modulator 200.

At step/operation 414, contact openings 225 are etched and contacts 220 are deposited into the contact openings 225 and patterned. In an example embodiment, a portion of the oxide layer 250 is deposited prior to the etching of the contact openings 225. For example, in an example embodiment, an oxide layer 250 is deposited to a thickness of 450-550 nm. The oxide layer and insulating layer 230 may then be etched to form the contact openings 225. For example, a lithography etching process may be used to etch the contact openings 225. In various embodiments, the contact openings 225 are configured to, when the contacts 220 are deposited into the contact openings, place the contacts into electrical communication and/or contact with a corresponding one of the first and second contact layer 130A, 130B. In various embodiments, the contacts 220 are formed by depositing a conductive and/or metal material such as aluminum, an aluminum alloy (e.g., AlSiCu), titanium, and/or the like.

At step/operation 416, when a radiator 210 is be present in the modulator 200, the radiator is formed and any remaining portion of the oxide layer 250 is deposited. In an example embodiment, the radiator 210 is formed during the same metal deposition and etching as the contacts. For example, the radiator may be formed by depositing a conductive and/or metal material such as aluminum, an aluminum alloy (e.g., AlSiCu), titanium, and/or the like and then etching the deposited conductive and/or metal material. The remaining portion of the oxide layer 250 may be deposited after the forming of the radiator 240. In various embodiments, the oxide layer 250 comprises thermal oxide, chemical vapor deposit oxide, tetraethyl orthosilicate (TEOS), and/or the like.

At step/operation 418, another insulating layer 230 is deposited on the exposed surface of the oxide layer 250. In an example embodiment, the insulating layer 230 comprises SiN. As should be understood, additional steps may be performed as part of the process to form the modulator 200 on the substrate 105. For example, the modulator 200 may further comprise a silicon waveguide, laser grating, laser cavity, an alignment mark, an echelle grating, and/or other components which may be formed at least in part simultaneously to the formation of the waveguide 100.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A modulator comprising:
   a waveguide comprising a waveguide column consisting of a waveguide material, the waveguide column having a first side and an opposite second side, the first and second sides extending out from a substrate;
   an etched layer disposed between the waveguide column and the substrate, a first side of the etched layer being in a same plane as the first side of the waveguide column and a second side of the etched layer being in a same plane as the second side of the waveguide column;
   a first contact layer (a) disposed on the first side of the waveguide column and the first side of the etched layer and (b) doped with a P-type dopant, wherein the P-type dopant extends from the first contact layer into a first portion of the waveguide column proximate to the first side; and
   a second contact layer (a) disposed on the second side of the waveguide column and the second side of the etched layer and (b) doped with an N-type dopant, wherein the N-type dopant extends from the second contact layer into a second portion of the waveguide column proximate to the second side,
   wherein the first contact layer and the second contact layer each consist of one or more materials that are different from the waveguide material.

2. The modulator of claim 1, wherein the first contact layer and second contact layer comprise at least one of polycrystalline silicon, polycrystalline germanium, or an amorphous composition.

3. The modulator of claim 1, wherein the P-type dopant is boron.

4. The modulator of claim 1, wherein the N-type dopant is phosphorus.

5. The modulator of claim 1, wherein the first contact layer is doped with at least $1\times10^{16}$ per cubic centimeter of the P-type dopant and the second contact layer is doped with at least $1\times10^{16}$ per cubic centimeter of the N-type dopant.

6. The modulator of claim 1, further comprising an insulating layer deposited on (a) a surface of the first contact layer opposite the waveguide column and (b) a surface of the second contact layer opposite the waveguide column.

7. The modulator of claim 6, further comprising a heater disposed adjacent one of the first contact layer or the second contact layer.

8. The modulator of claim 6, further comprising an oxide layer deposited on the insulating layer.

9. The modulator of claim 8, further comprising a radiator embedded within the oxide layer.

10. The modulator of claim 1, wherein a width of the waveguide column between the first side and the second side is in a range of 0.2 to 0.6 microns.

11. The modulator of claim 1, wherein the waveguide material comprises GeSi.

12. The modulator of claim 1, further comprising a first contact and a second contact, wherein the first contact is in electrical communication with the first contact layer and the second contact is in electrical communication with the second contact layer.

13. The modulator of claim 1, wherein the modulator is a wavelength division multiplexing modulator.

14. The modulator of claim 1, wherein the waveguide is configured for passing light having a wavelength in a range of 1260-1670 nm.

15. The modulator of claim 1, wherein a concentration of the P-type dopant in at least the first portion of the waveguide column is in a range of $1\times10^{15}$ to $1\times10^{19}$ per cubic centimeter of the P-type dopant.

16. The modulator of claim 1 wherein a concentration of the N-type dopant in at least the second portion of the waveguide column is in a range of $1\times10^{15}$ to $1\times10^{19}$ per cubic centimeter of the N-type dopant.

17. The modulator of claim 1, wherein a width of the first portion of the waveguide column is in a range of 0.1 to 0.2 microns.

18. The modulator of claim 1, wherein a width of the second portion of the waveguide column is in a range of 0.1 to 0.2 microns.

19. A modulator comprising:
a substrate;
a waveguide material deposited onto an etched layer the substrate and formed into a waveguide column;
the etched layer disposed between the substrate and the waveguide material;
a first contact layer doped with a P-type dopant and deposited on a first side of the waveguide column and a first side of the etched layer, wherein the P-type dopant extends from the first contact layer into a first portion of the waveguide column proximate to the first side;
a second contact layer doped with an N-type dopant and deposited on a second side of the waveguide column and a second side of the etched layer, wherein the N-type dopant extends from the second contact layer into a second portion of the waveguide column proximate to the second side; and
first and second contacts, the first contact being in electrical communication with the first contact layer and the second contact being in electrical communication with the second contact layer,
wherein the first contact layer and the second contact layer each consist of one or more materials that are different from the waveguide material.

20. The modulator of claim 19, wherein the first contact layer and the second contact layer comprise at least one of polycrystalline silicon, polycrystalline germanium, or an amorphous composition.

21. The modulator of claim 19, further comprising:
an insulating layer deposited on the waveguide column, the first contact layer, and the second contact layer; and
a heater disposed adjacent one of the first contact layer or the second contact layer.

22. The modulator of claim 21, further comprising:
an oxide layer deposited on the insulating layer; and
a radiator embedded within the oxide layer adjacent one of the first contact layer or the second contact layer.

23. The modulator of claim 19, wherein a width of the waveguide material in a direction substantially orthogonal to a transmission axis defined by the waveguide material is less than one micron.

24. The modulator of claim 19, wherein the first contact layer is doped with at least $1\times10^{16}$ per cubic centimeter of the P-type dopant and the second contact layer is doped with at least $1\times10^{16}$ per cubic centimeter of the N-type dopant.

25. The modulator of claim 19, wherein a concentration of the P-type dopant in at least the first portion of the waveguide column is in a range of $1\times10^{15}$ to $1\times10^{19}$ per cubic centimeter of the P-type dopant.

26. The modulator of claim 19, wherein a concentration of the N-type dopant in at least the second portion of the waveguide column is in a range of $1\times10^{15}$ to $1\times10^{19}$ per cubic centimeter of the N-type dopant.

27. The modulator of claim 19, wherein a width of the first portion of the waveguide column is in a range of 0.1 to 0.2 microns.

28. The modulator of claim 19, wherein a width of the second portion of the waveguide column is in a range of 0.1 to 0.2 microns.

* * * * *